US010585853B2

(12) United States Patent
Hanusiak et al.

(10) Patent No.: US 10,585,853 B2
(45) Date of Patent: Mar. 10, 2020

(54) SELECTING IDENTIFIER FILE USING MACHINE LEARNING

(71) Applicant: INTERNATIONAL BUSINESS MACHINES CORPORATION, Armonk, NY (US)

(72) Inventors: Tomasz Hanusiak, Czarny Dunajec (PL); Konrad W. Komnata, Kraków (PL); Jaroslaw Osinski, Mrozy (PL); Grzegorz Szczepanik, Kraków (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 276 days.

(21) Appl. No.: 15/597,504

(22) Filed: May 17, 2017

(65) Prior Publication Data

US 2018/0336323 A1 Nov. 22, 2018

(51) Int. Cl.
*G06F 16/14* (2019.01)
*G06N 20/00* (2019.01)
*G06F 16/13* (2019.01)
*G06F 21/73* (2013.01)
*G06F 21/12* (2013.01)
*G06N 3/04* (2006.01)
*G06F 8/61* (2018.01)

(52) U.S. Cl.
CPC ............ *G06F 16/148* (2019.01); *G06F 16/13* (2019.01); *G06F 21/121* (2013.01); *G06F 21/73* (2013.01); *G06N 3/0427* (2013.01); *G06N 3/0481* (2013.01); *G06N 20/00* (2019.01); *G06F 8/61* (2013.01)

(58) Field of Classification Search
CPC ...... G06F 16/148; G06F 16/13; G06F 12/121; G06F 27/73; G06F 8/61; G06N 20/00; G06N 3/04
See application file for complete search history.

(56) References Cited

U.S. PATENT DOCUMENTS

| 7,487,544 | B2 | 2/2009 | Schultz et al. | |
|---|---|---|---|---|
| 7,519,998 | B2 | 4/2009 | Cai et al. | |
| 9,047,161 | B1* | 6/2015 | Burr | G06F 21/105 |
| 9,304,980 | B1* | 4/2016 | Hartsook | G06F 21/577 |
| 2004/0236884 | A1 | 11/2004 | Beetz | |
| 2007/0276823 | A1* | 11/2007 | Borden | H04L 9/3239 |

(Continued)

OTHER PUBLICATIONS

Ryan M. Harris, "Using Artificial Neural Networks for Forensic File Type Identification", CERIAS Tech Report 2007-19, Center for Education and Research in Information Assurance and Security, Purdue University, May 2007, pp. 1-66.

*Primary Examiner* — Paul E Callahan
(74) *Attorney, Agent, or Firm* — Cantor Colburn LLP; Jeffrey S LaBaw (57) ABSTRACT

Embodiments of the present invention are directed to a computer-implemented method for selecting an identifier file for a software product. An example method includes installing the software product on a machine. The method further includes determining a list of files of the software product by scanning a file system of the machine. The method further includes selecting an identifier file from the list of files using a machine learning algorithm. The method further includes updating a license of the software product on the machine with the identifier file.

16 Claims, 9 Drawing Sheets

(56) References Cited

U.S. PATENT DOCUMENTS

| | | |
|---|---|---|
| 2013/0246352 A1 | 9/2013 | Spurlock et al. |
| 2015/0363691 A1 | 12/2015 | Gocek et al. |
| 2017/0220605 A1* | 8/2017 | Nivala ............... G06F 16/27 |

\* cited by examiner

SELECTING IDENTIFIER FILE USING MACHINE LEARNING

BACKGROUND

The present invention relates to computer technology, and more specifically, to software licensing and audit by identifying a unique identifier for a software product.

During verification and/or validation of a license of a software product that is installed on a computer system, the software needs to have a unique identifier, which identifies exactly what this software is. In one or more examples, a file used by the software is used as the unique identifier. However, it is technically challenging to identify an identifier for a software product, because many files used by various software products are similar.

SUMMARY

Embodiments of the present invention are directed to a computer-implemented method for selecting an identifier file for a software product. An example method includes installing the software product on a machine. The method further includes determining a list of files of the software product by scanning a file system of the machine. The method further includes selecting an identifier file from the list of files using a machine learning algorithm. The method further includes updating a license of the software product on the machine with the identifier file.

Embodiments of the present invention are directed to a computer program product for selecting an identifier file for a software product installed on a machine, the computer program product including a computer readable storage medium having program instructions embodied therewith, the program instructions executable by a processing circuit to cause the processing circuit to determine a list of files of the software product by scanning a file system of the machine. The instructions further cause the processing circuit to select the identifier file from the list of files using a machine learning algorithm. The instructions further cause the processing circuit to update a license of the software product on the machine with the identifier file.

Embodiments of the present invention are directed to a system for selecting an identifier file for a software product installed on a machine. An example system includes a memory, and a processor coupled to the memory. In one or more examples, the processor determines a list of files of the software product by scanning a file system of the machine. The processor selects the identifier file from the list of files using a machine learning algorithm. The processor updates a license of the software product on the machine with the identifier file.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In computer systems, typically, a software product installed on a computer system has a unique identifier, which defines exactly what this software product is. In one or more examples, the computer system associates a file as a unique identifier of the software product. It is technically challenging to identify a unique identifier file for the software product because many files used by various software products installed on the computer system are similar. Further, the various software products may use common files. Technical solutions described herein address the above technical challenge, by identifying a unique identifier file for a software product using machine-learning techniques, such as neural networks. For example, the technical solutions use self-adjusting neural networks to find the unique identifier files used for software licensing process. Thus, the technical solutions facilitate finding identifier files for software products in an automatic manner, based on files already existing on the computer system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
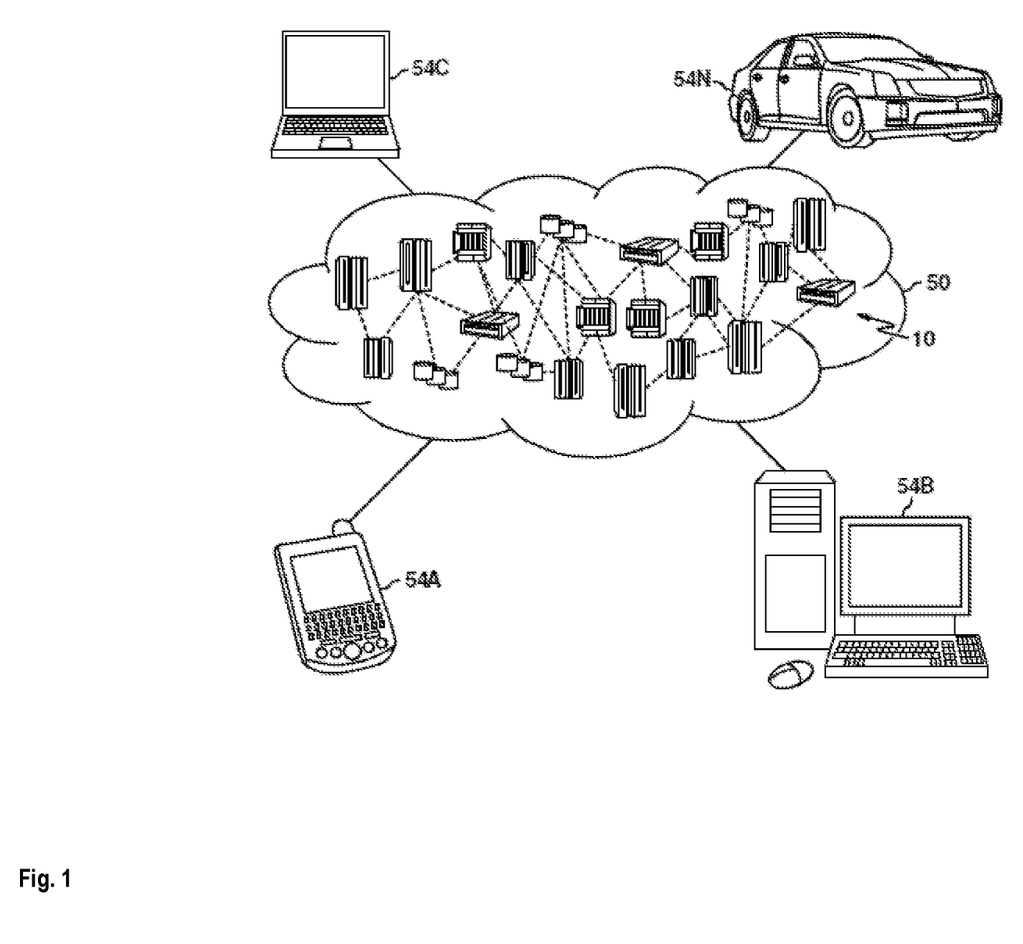
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
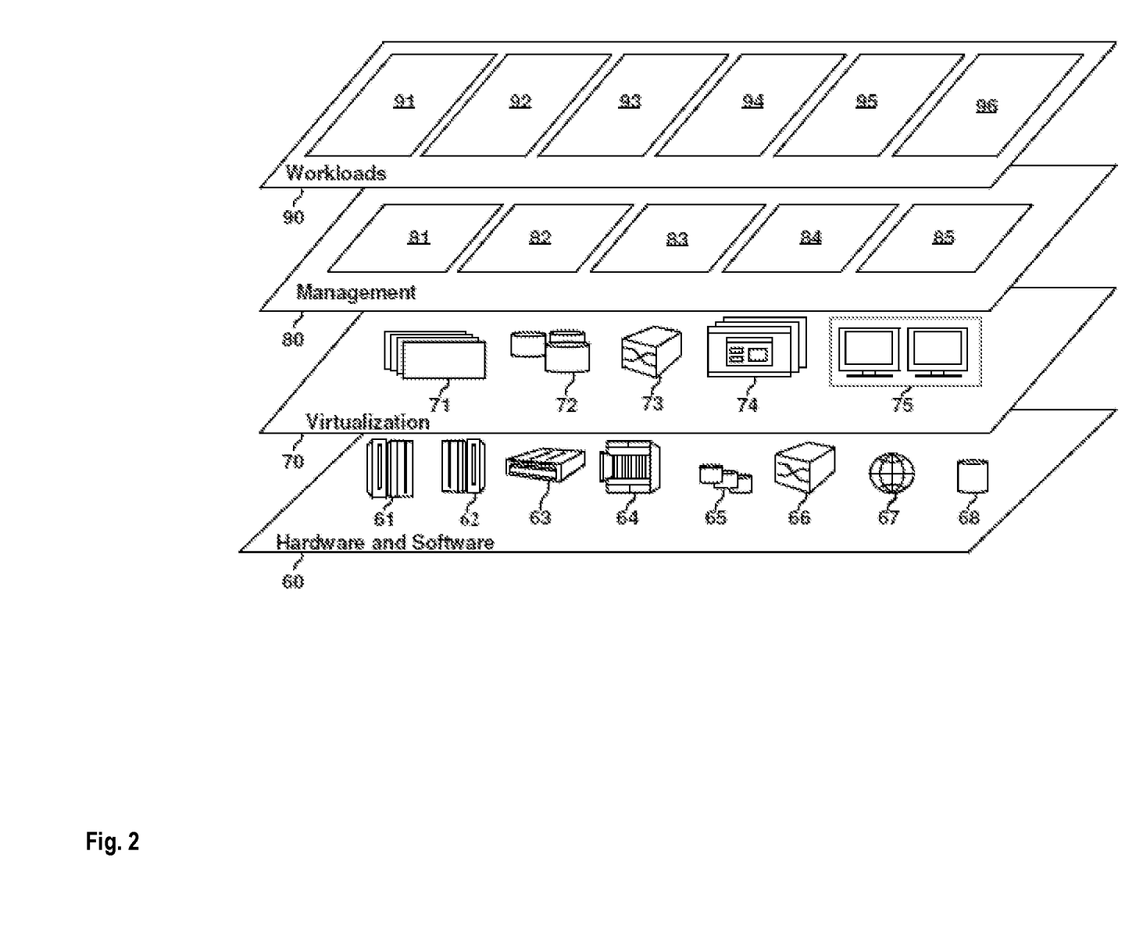
FIG. 2 depicts a set of functional abstraction layers provided by cloud computing environment according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software product identifier determination 96.

Figure 3:
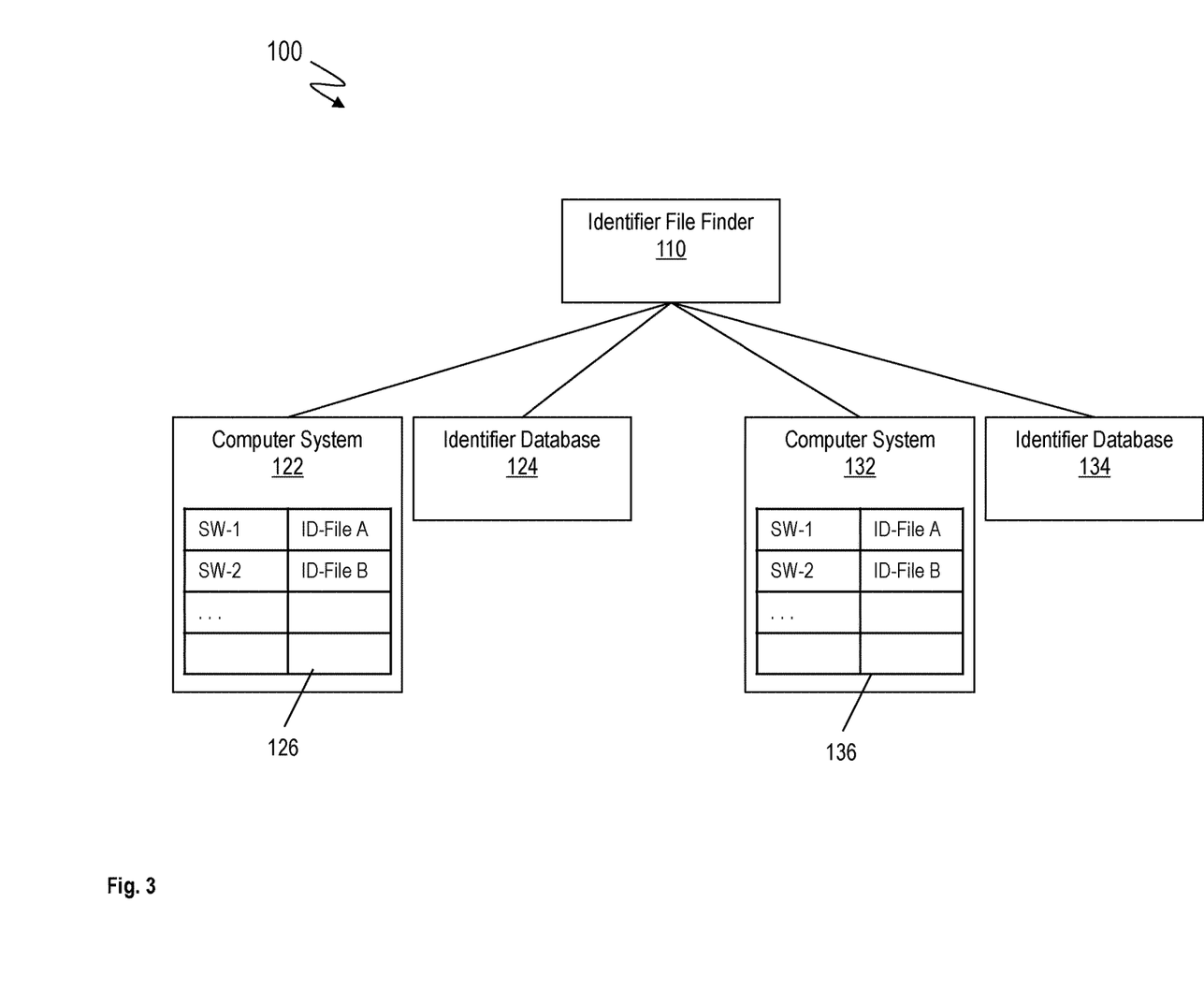
FIG. 3 depicts an example system for determining an identifier file for a software product, according to one or more embodiments of the present invention.

FIG. 3 depicts an example system 100 for determining an identifier file for a software product, according to one or more embodiments of the present invention. In the depicted example, an identifier file finder 110 is in communication with multiple computer systems, and databases, such as a computer system 122, a computer system 132, an identifier database 124, and an identifier database 134. It should be noted that although FIG. 3 depicts only two computer systems and two databases, in other examples, the identifier file finder 110 communicates with a different number of computer systems and/or databases.

The computer system 122 (and 132) is a typical computer, such as a desktop computer, a server computer, a laptop computer, a mobile computer, a tablet computer, a phone, or any other computing device on which a software product can be installed and executed. The identifier database 124 (and 134) is a database that includes information about unique file identifiers of the software products that are installed on the computer system 122. It should be noted that although FIG. 3 depicts the identifier database 124 separate from the computer system 122, in one or more examples, the identifier database 124 is a part of the computer system 122 itself. Further, in one or more examples, the identifier database 124 is common to all of the multiple computer systems for which the identifier file finder 110 identifies the unique identifier files.

Further, FIG. 3 depicts installed software products 126 associated with the computer system 122 and installed software products 136 associated with the computer system 132. The installed software products are software products that are installed on the corresponding computer system. For example, the installed software products 126 include MICROSOFT™, WORD™, POWERPOINT™, EXCEL™, ADOBE™ ACROBAT™, PHOTOSHOP™, MEDIA PLAYER™, SAFARI™, IBM™ DB2™, LOTUS NOTES™, or any other software product that is installed on the computer system 122. Each of the installed software products 126 includes corresponding files used for executing the specific software product. For example, the files include computer executable instructions (e.g. java files, C files etc.), media files (e.g. images, videos, audio etc.), supporting libraries (e.g. dynamic link libraries (DLLs), COM object files etc.), or any other such electronic files that the software product uses for being executed by the processor 205. One or more of the files used by the software product is selected as a unique identifier of the software product, as depicted by the list of software products 126. As depicted, each installed software product 126 has a corresponding unique identifier file. The existence of the unique identifier file indicates the presence, and sometimes valid license of the corresponding software product.

For example, in computer system 122 the software product 1 has a corresponding identifier file File-A. File-A is part of the software product 1 and was installed with that software product. The computer system 122 can determine if the software product 1 exists, that is, installed on the computer system 122, by determining the existence of the File-A on the computer system 122. In one or more examples, the identifier database 124 includes a pairing between the software product 1 and the File-A so that a software product 2 installed on the computer system 122 uses a different file, File-B as its unique identifier. The computer system 132 and the identifier database 134 also have a similar pairing of the installed software products 136 and corresponding identifier files.

In one or more examples, if an identifier database is shared among the different computer systems, the software products installed on the different computer systems each have a unique identifier file across the different computer systems. Thus, in such a case, the software product 1 has File-A as the identifier file on each computer system the software product 1 is installed on.

In one or more examples, if the identifier database is unique to each computer system, each computer system can have a different identifier file for a software product. For example, the computer system 122 can have File-A as the identifier file for the software product 1 and the computer system 132 can have File-B as the identifier file for the software product 1.

The identifier file finder 110 determines the unique identifier files for a software product that is installed on the computer system, such as the computer system 122. In one or more examples, the identifier file finder 110 is a separate machine, such as a separate computer system from the computer system 122. Alternatively, in one or more examples, the identifier file finder 110 is a computer program product that executes on the computer system 122 itself. In either case, the identifier file finder 110 is a computer system, such as a desktop computer, a laptop computer, a server computer, a tablet computer, a phone, or any other computing device, or a computer product executable on such a computing device.

Figure 4:
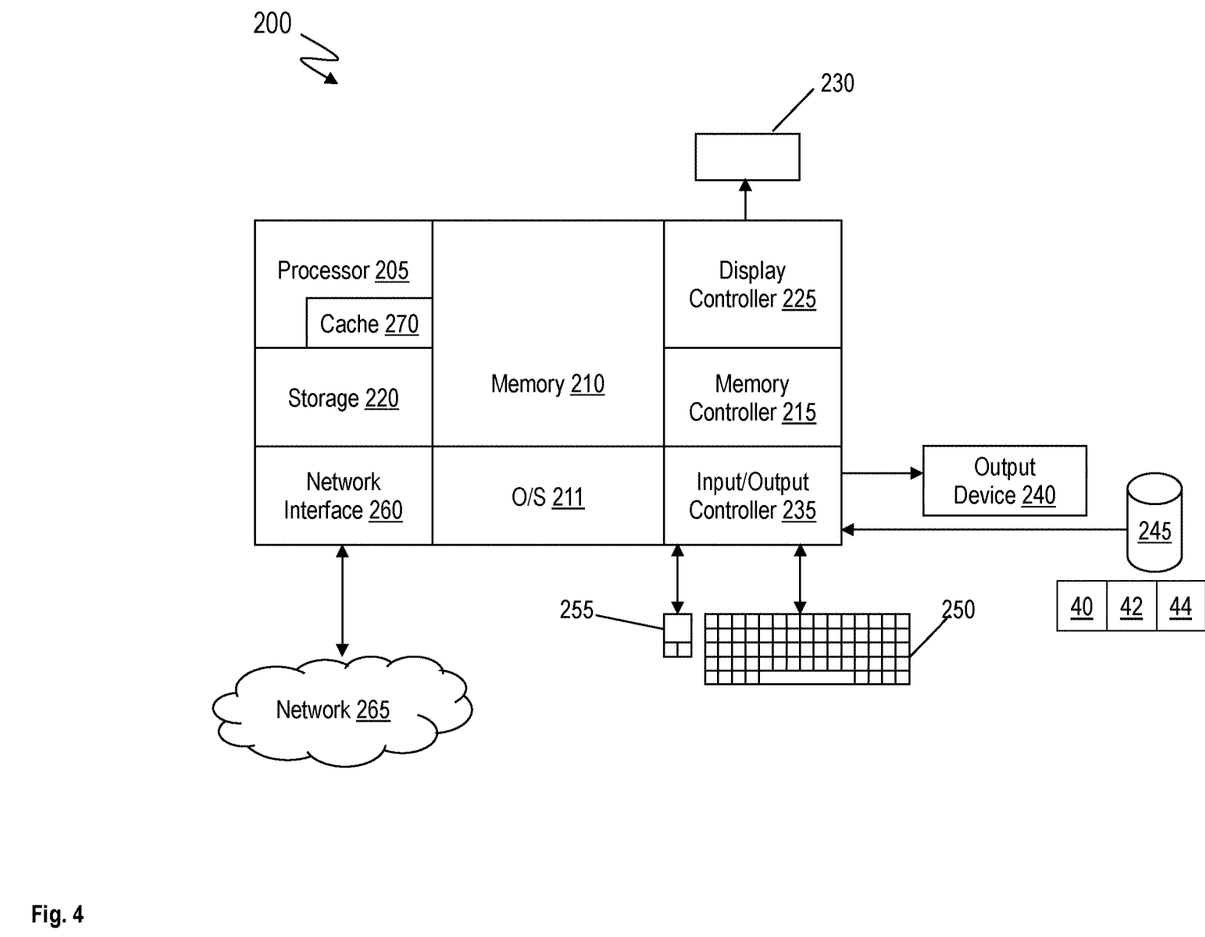
FIG. 4 depicts an example computer system, according to one or more embodiments of the present invention.

FIG. 4 depicts an example computer system 200, according to one or more embodiments of the present invention. The computer system 200 can be used as the computer system 122, the computer system 132, and/or the identifier file finder 110, in one or more examples. The computer system 200 includes hardware, such as electronic circuitry, that can execute software products, such as program instructions.

The computer system 200 includes, among other components, a processor 205, a memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter 40, accelerometer 42, GPS 44), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 100, a semiconductor based microprocessor (in the form of a microchip or chip set), a macroprocessor, or another device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read-only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The computer system 200 may further include a display controller 225 coupled to a user interface or display 230. In some embodiments, the display 230 may be an LCD screen. In other embodiments, the display 230 may include a plurality of LED status lights. In some embodiments, the computer system 200 may further include a network interface 260 for coupling to a network 265. The network 265 may be an IP-based network for communication between the computer system 200 and an external server, client and the like via a broadband connection. In an embodiment, the network 265 may be a satellite network. The network 265 transmits and receives data between the computer system 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

In one or more examples, the identifier file finder 110 uses machine learning techniques to determine the identifier file for a software product installed on the computer system 122. For example, the identifier file finder 110 uses artificial neural networks (ANN) to determine the identifier file.

ANNs are a family of models inspired by biological neural networks (the central nervous systems of animals, in particular, the brain), which are used to estimate or approximate functions that depend on a large number of inputs and are generally unknown. In one or more examples, the identifier file finder 110 uses a learning with tutor paradigm during a training phase so as to automatically determine the identifier files once trained. In one or more examples, an entry value to the neural network used for determining the identifier file is a vector with all files of a specific software product. Every neuron in the ANN finds a unique file, (for example, based on name and size of a file), comparing the file's attributes to a dynamically created knowledge base. The knowledge base can be an identifier database, which serves as a reference list of identifier files, to which files are compared during the audit process. For example, during a software licensing audit of the computer system 122, the computer system 122 is scanned to determine the installed software products 126 on the computer system 122. Further, it is determined if the computer system 122 is authorized to execute the installed software products 126 by checking licenses for the installed software products 126 on the computer system 122 are valid (unexpired).

The ANN neuron calculation outputs attributes (for example, name) of a unique file, which can serve as software product identifier file. In one or more examples, first few iterations of the ANN are performed with a tutor who informs the ANN if the output value is correct for known cases of software products with predetermined identifier files. Next iterations (next software products) are handled with auto learning paradigm, where the ANN can determine which file is an optimal candidate to serve as the identifier file for the software product.

Figure 5:
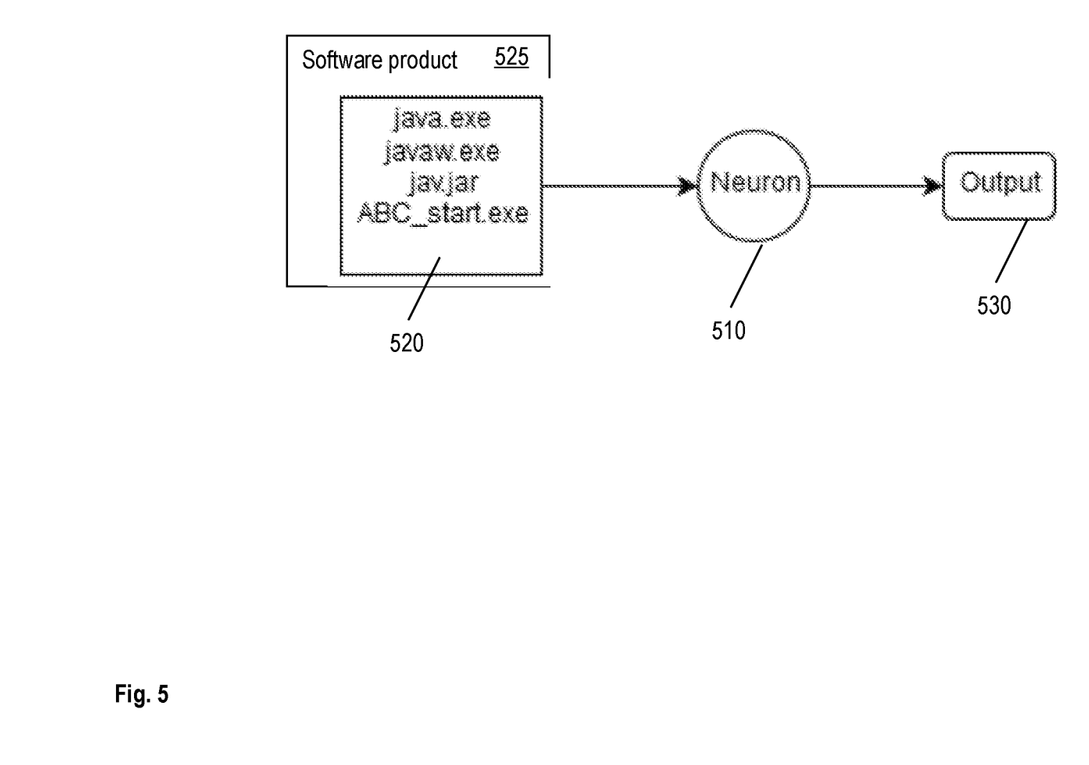
FIG. 5 depicts an example neuron of an ANN that is used for determining an identifier file for a software product, according to one or more embodiments of the present invention.

FIG. 5 depicts an example neuron 510 of the ANN that is used for determining an identifier file for a software product, according to one or more embodiments of the present invention. The neuron 510 receives, as input, a vector or list of files 520 in the software product 525. The output 530 of the neuron 510 is a name or identifier of a file from the list of files 520 that the neuron indicates to be used as the identifier file for the software product 525. The neuron 510 uses an activation function, which analyzes the list of files 520 and selects the output 530.

Figure 6:
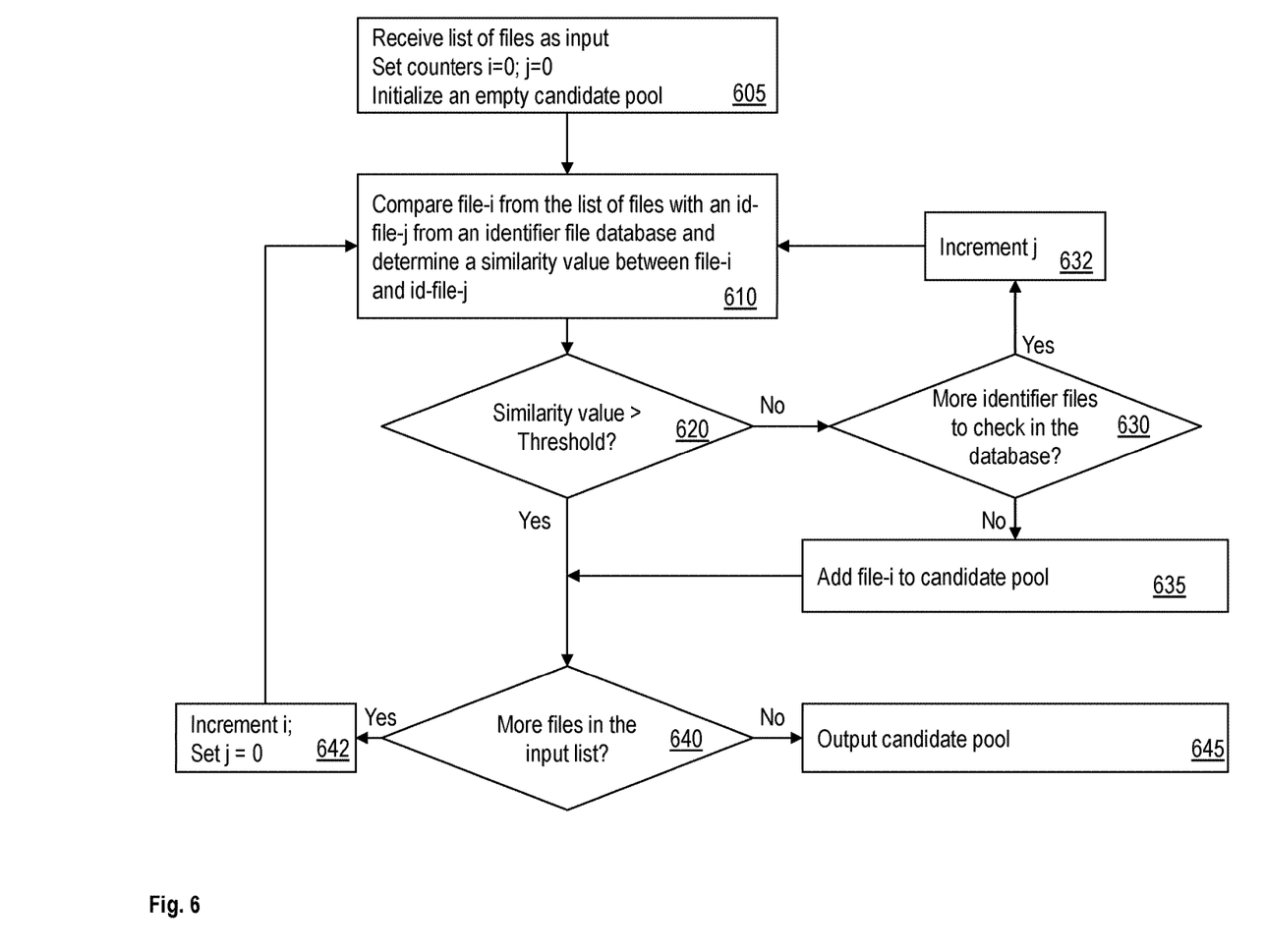
FIG. 6 depicts a flowchart for an activation function of a neuron for selecting an identifier file from an input list of files, according to one or more embodiments of the present invention.

FIG. 6 depicts a flowchart for an activation function of the neuron 510 for selecting an identifier file from the input list of files 520, according to one or more embodiments of the present invention. The neuron 510 receives, as input, the list of files 520, as shown at 605. The neuron 510 sets a marker, i, for indicating which file from the list of files 520 is being analyzed, as shown at 605. Further, the neuron 510 sets a marker, j, for indicating which file from an identifier database 124 is being compared, as shown at 605. It should be noted that although in the depicted example, the neuron 510 starts from i=0, and j=0, the different marker values are used in other examples. The neuron 510 further initializes an empty candidate pool of files that can be used as an identifier file for the software product, as shown at 605.

Further, the neuron 510 compares file-i from the list of files 520 with an id-file-j from an identifier file database 124 and determines a similarity score between file-i and id-file-j, as shown at 610. In one or more examples, the similarity score is determined based on the names of the files, for example, a number of characters matching between the two file names. Alternatively, or in addition, the similarity score is a ratio between the number of matching characters and non-matching characters. Further, in other examples, alternatively, or in addition, other attributes of the files are used for computing the similarity score. For example, sizes of the files, date of creation, date of modification, location of the file (path), are used for computing the similarity score, among other attributes/properties of the file. The similarity score thus indicates a similarity between the file from the list of files 520 and a file from the identifier file database 124.

The neuron 510 further checks if the similarity score between the file from the list of files 520 and an identifier file from the identifier file database 124 exceeds a predetermined threshold, for example, 60%, 70%, or any other threshold, as shown at 620. Although the examples above indicate the similarity score in percentages, it should be noted that in other examples, the scores may be a numeric value and not a percentage.

If the similarity score is above (or equal to) the threshold, that is if the file from the list of files 520 is similar to the file compared from the identifier database 124, the file is not used as an identifier, and a next file is checked in the above manner, if available, as shown at 620, 640, and 642. Thus, the neuron 510 checks if the list of files 520 has additional files for analyzing, and if so compares that file with the identifier database 124, as shown at 640 and 642. If there are not additional files left to check in the list of files 520, the neuron 510 outputs the candidate pool, as shown at 645.

If the similarity score is below the predetermined threshold, the neuron 510 continues to compare the file with additional files from the identifier file database 124, as shown at 630 and 632. For example, the neuron 510 checks if additional files exist in the identifier file database 124 that are yet to be compared with the file-i, as shown at 630. If there are additional files, the neuron 510 updates the marker j accordingly, for example by incrementing it, and uses the next file-j for the comparison, as shown at 632. If there are no additional files left in the identifier file database 124 that are yet to be compared with the file-i, it indicates that the similarity scores of file-i with respect to each file in the identifier file database 124 is below the predetermined threshold. Accordingly, the neuron 510 adds file-i to the candidate pool, as shown at 635. The neuron 510 further checks if additional files from the list of files 520 are to be analyzed. If there are not additional files left to analyze in the list of files 520, the neuron 510 outputs the candidate pool, as shown at 645. In case of additional files to analyze, the neuron 510 updates the marker i, for example incrementing it, to access the next file-i in the list of files 520, as shown at 642.

Alternatively, or in addition, the neuron 510 selects one file from the candidate pool and outputs the selected file. For example, the neuron 510 selects the file with the smallest total of the similarity scores as the output 530. For example, the neuron 510 keeps a running total of the similarity scores for each file during the comparison, and a candidate file, which is a file from the candidate pool, with the smallest running total of the similarity scores is selected as the output. In other examples, the file with the smallest mean (average) of the similarity scores is selected.

Figure 7:
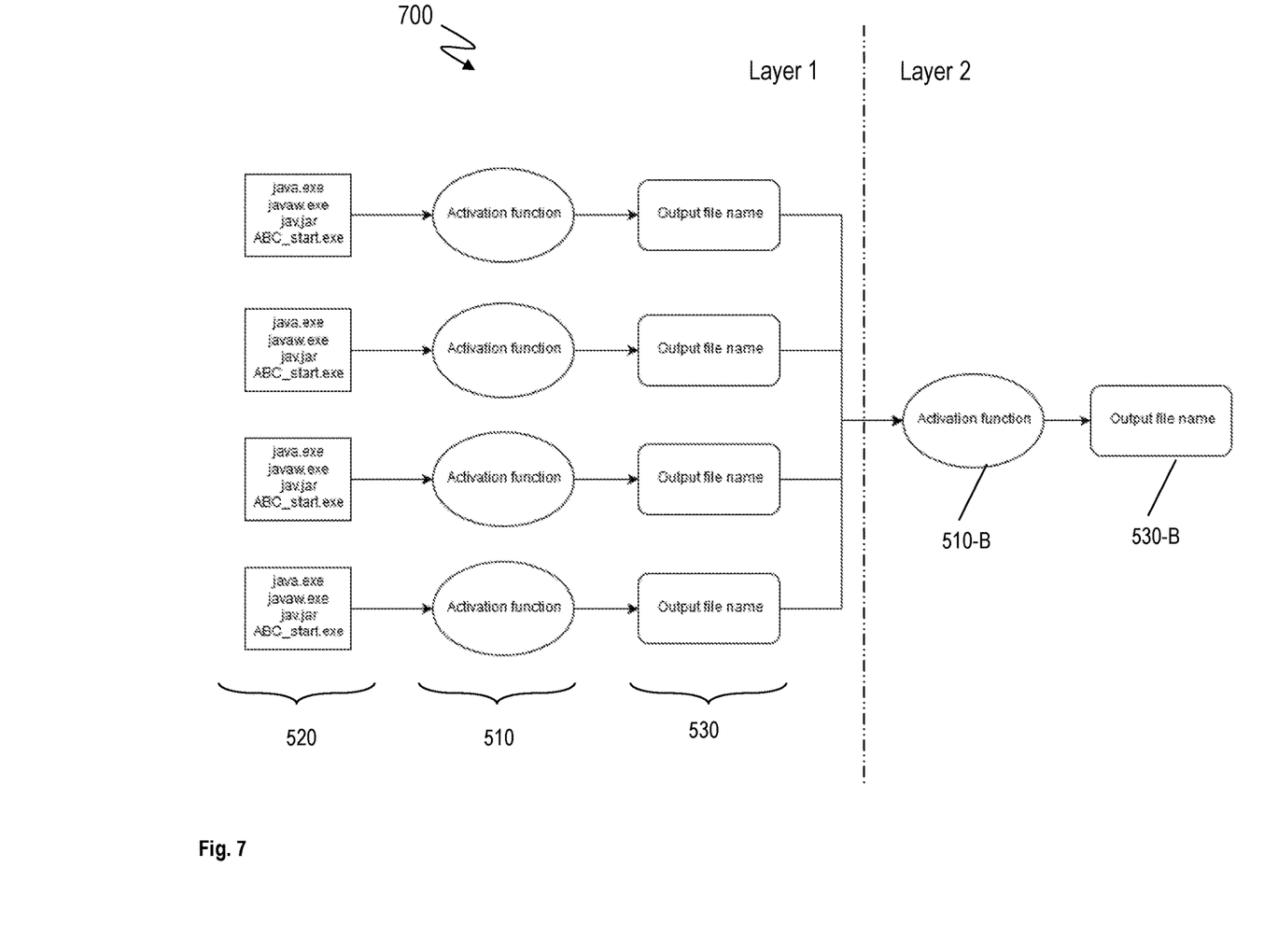
FIG. 7 depicts an example neural network used for selecting an identifier file from an input list of files, according to one or more embodiments of the present invention.

FIG. 7 depicts an example neural network 700 used for selecting an identifier file from the input list of files 520, according to one or more embodiments of the present invention. The neural network 700 includes multiple neurons 510 that receive, as input, the list of files 520. Each neuron 510 provides respective outputs 530 of candidate files based on an activation function of each neuron 510. For example, the activation function for a first neuron may include a different similarity score threshold than that of a second neuron from the set of neurons in a layer. Alternatively, or in addition, a first neuron may use a different set of file attributes to compute the similarity score than a set of file attributes used by a second neuron. For example, the first neuron uses a filename, while a second neuron uses a file size to compute respective similarity scores.

Thus, neurons 510 from a first layer of the neural network 700 provide a set of files as output 530, the outputted files being candidates for being an identifier file for the software product being processed by the neural network 700. The output 530 from the neurons 510 of the first layer is used as input to neurons 510-B of a second layer of the neural network 700. The neurons 510-B has an activation function that computes and compares similarity scores of the files output by the first layer, and thus selects and outputs 530-B the identifier file for the software product from the candidate files output by the first layer neurons 510.

It should be noted that although FIG. 7 depicts only two layers, in one or more examples, the neural network 700 includes additional layers of neurons, where the output from neurons from a preceding layer is used as input by the neurons of the next adjacent layer.

In one or more examples, the identifier file finder 110 updates a license of the software product based on the identifier file corresponding to the software product. For example, the license stored on the computer system 122 is updated to include a hash or some other computation based on the identifier file. Accordingly, during a license audit process, the identifier file is verified along with expiry and other validation information of the license of the software product.

Figure 8:
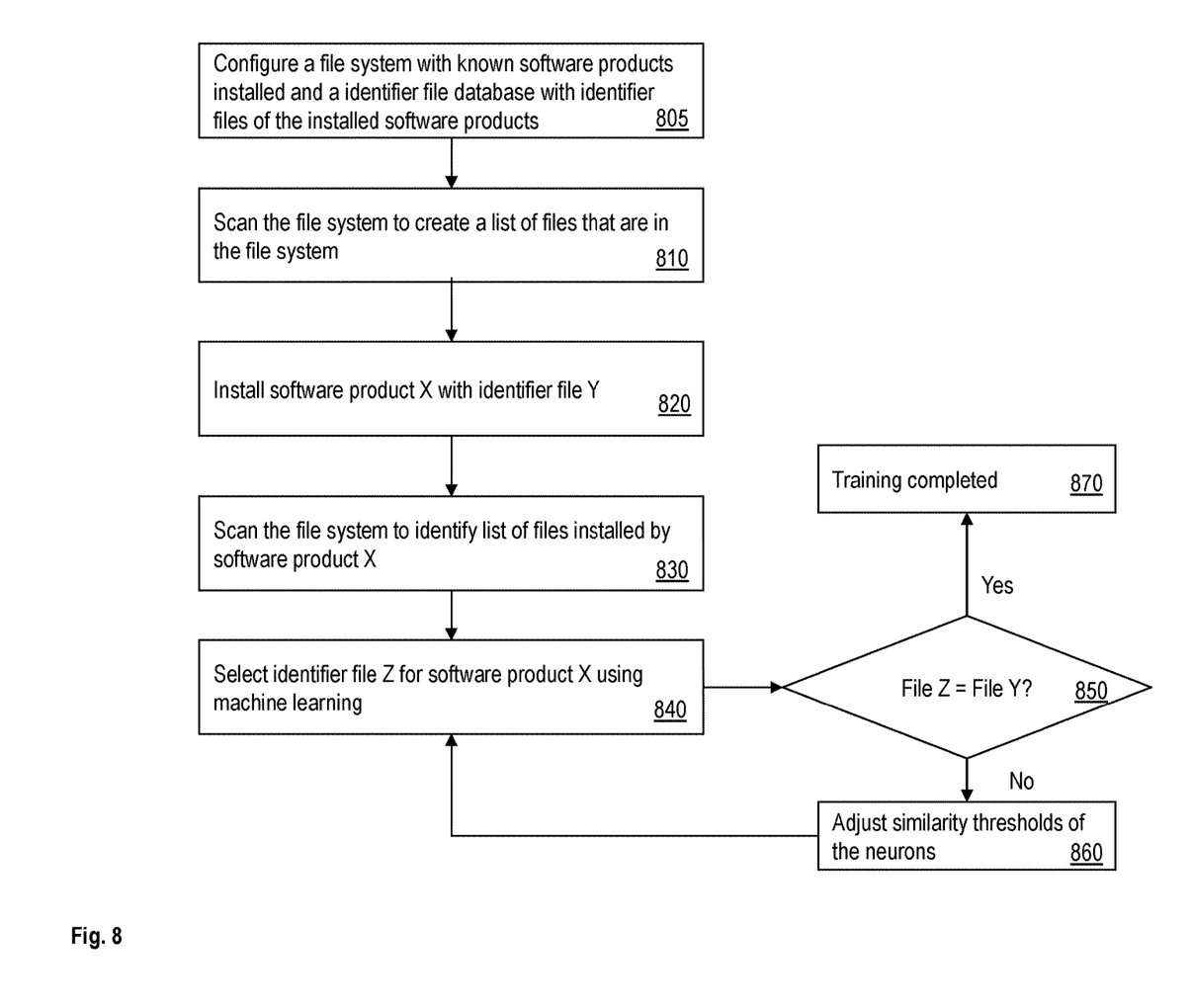
FIG. 8 depicts a flowchart for training a neural network, according to one or more embodiments of the present invention.

FIG. 8 depicts a flowchart for training the neural network 700, according to one or more embodiments of the present invention. The identifier file finder 110 implements the method to train the machine learning algorithm it uses for selecting the identifier file a for a software product. The identifier file finder 110 configures a file system of the computer system 122 with known installed software products 126 and populates the identifier file database 124 with identifier files of the installed software products 126, as shown at 805. The identifier file finder 110 scans the file system to create a list of files that are in the file system, as shown at 810.

The identifier file finder 110 further installs a predetermined software product, say software product X onto the computer system 122, as shown at 820. The software product X is to be associated with an identifier file, file-Y, as shown at 810. The file-Y is the expected result in this case, for example, because of the installed software 126 that are already installed on the computer system 122.

The identifier file finder 110 scans the file system a second time, after the installation of the software product X, to identify a list of files installed by the software product X, as shown at 830. The identifier file finder 110 further executes the machine-learning algorithm to select identifier file Z for the software product X, as shown at 840. The identifier file finder 110 checks if the file Z selected by the machine learning algorithm, such as the neural network 700 matches the expected result file Y, that is, in other words, checks if file Z output by the algorithm is same as the file Y, as shown at 850. If the expected result matches the output of the machine learning algorithm, the training of the machine learning algorithm is completed, as shown at 870.

If the expected result does not match the output from the machine-learning algorithm, the machine-learning algorithm parameters are adjusted, as shown at 860. For example, the similarity scores for one or more neurons of the neural network may be adjusted (increased/decreased). The machine-learning algorithm is further executed using the list of files for the software product X until the output matches the expected result, in this case, file Y, as shown at 840.

Figure 9:
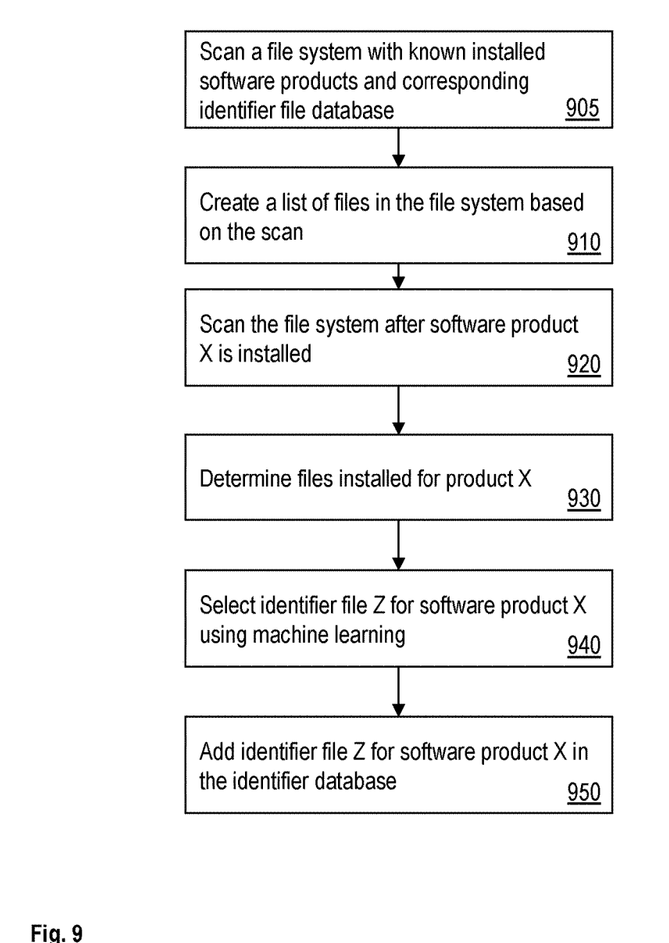
FIG. 9 depicts a flowchart for finding an identifier file for a software product installed on a computer system, according to one or more embodiments of the present invention.

FIG. 9 depicts a flowchart for finding an identifier file for a software product installed on a computer system, according to one or more embodiments of the present invention. In one or more examples, the method is initiated in response to the identifier file finder 110 receiving a request to select the identifier file for the software product, say software product X, that is about to be installed on the computer system 122.

The identifier file finder 110 scans the file system of the computer system 122 and generates a list of known installed software products 126 and corresponding identifier file database 124, as shown at 905. The identifier file finder 110 also creates a list of files in the file system based on the scan, as shown at 910.

Further, the identifier file finder 110 scans the file system after the software product X is installed, as shown at 920. The identifier file finder 110 determines a list of files installed for product X, as shown at 930. For example, the list of files for software product X is determined by computing a delta between a list of files in the file system after the software product X is installed and the list of files from before the installation.

The identifier file finder 110 uses a machine learning algorithm, such as the neural network algorithm, to select an identifier file Z for the software product X, as shown at 940. The identifier file finder 110 adds the identifier file Z for the software product X in the identifier database 124, as shown at 950.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selecting an identifier file for a software product, the method comprising:
   installing the software product on a machine;
   determining, for a software product installed on a machine, a list of files of the software product by scanning a file system of the machine;
   selecting an identifier file from the list of files using a machine learning algorithm by creating an identifier file database for the machine, wherein the identifier file database comprises information of a plurality of identifier files, each identifier file corresponding to a respective software product installed on the machine,
   wherein selecting the identifier file further comprises:
   using a neural network comprising:
      neurons in a first layer, each neuron in the first layer:
         computing a similarity score for each file in a list of input files by
         comparing the each file with each identifier file from the identifier file database: and
         comparing the similarity score with a respective predetermined similarity threshold: and
         outputting a candidate identifier file based on the comparison: and neurons in a second layer, a neuron in the second layer:
         receiving the outputs from the neurons in the first layer, and
         selecting the identifier file from the outputs from the neurons in the first layer: and
   updating a license of the software product on the machine with the selected identifier file.

2. The computer-implemented method of claim 1, further comprising:
   updating the identifier file database by adding information about the selected identifier file.

3. The computer-implemented method of claim 1, wherein selecting the identifier file further comprises:
   comparing a file from the list of files of the software product with an identifier file database; and
   rejecting the file as the identifier file in response to a similarity score of the file being above a predetermined threshold.

4. The computer-implemented method of claim 3, wherein the similarity score of the file is determined by comparing one or more attributes of the file with each identifier file in the identifier file database.

5. The computer-implemented method of claim 4, wherein the one or more attributes of the file includes at least one from a group of attributes consisting of filename, file-size, and file-path.

6. The computer-implemented method of claim 1, wherein each neuron uses a different predetermined similarity threshold.

7. The computer-implemented method of claim 1, wherein each neuron uses a different activation function to compute the similarity score of a file.

8. A computer program product for selecting an identifier file for a software product installed on a machine, the computer program product comprising a non-transitory computer readable storage medium having program instructions embodied therewith, the program instructions executable by a processing circuit to cause the processing circuit to:
   determine a list of files of the software product by scanning a file system of the machine;
   select the identifier file from the list of files by creating an identifier file database for the machine, wherein the identifier file database comprises information of a plurality of identifier files, each identifier file corresponding to a respective software product installed on the machine,
   wherein selecting the identifier file further comprises:
   using a neural network comprising:
      neurons in a first layer, each neuron in the first layer:
         computing a similarity score for each file in a list of input files by
         comparing the each file with each identifier file from the identifier file database: and
         comparing the similarity score with a respective predetermined similarity threshold: and
         outputting a candidate identifier file based on the comparison: and neurons in a second layer, a neuron in the second layer:
         receiving the outputs from the neurons in the first layer, and
         selecting the identifier file from the outputs from the neurons in the first layer: and
   update a license of the software product on the machine with the selected identifier file.

9. The computer program product of claim 8, wherein the program instructions further cause the processing circuit to:
   compare a file from the list of files of the software product with an identifier file database; and
   reject the file as the identifier file in response to a similarity score of the file being above a predetermined threshold.

10. The computer program product of claim 9, wherein the similarity score of the file is determined by comparing one or more attributes of the file with each identifier file in the identifier file database.

11. The computer program product of claim 10, wherein the one or more attributes of the file includes at least one from a group of attributes consisting of filename, file-size, and file-path.

12. The computer program product of claim 8, wherein the program instructions further cause the processing circuit to:
   update the identifier file database by adding information about the selected identifier file.

13. The computer program product of claim 8, wherein each neuron uses a different predetermined similarity threshold.

14. The computer program product of claim 8, wherein each neuron uses a different activation function to compute the similarity score of a file.

15. A system for selecting an identifier file for a software product installed on a machine, the system comprising:
   a memory; and
   a processor coupled to the memory, the processor configured to:
      determine a list of files of the software product by scanning a file system of the machine;
      select the identifier file from the list of files by creating an identifier file database for the machine, wherein the identifier file database comprises information of a plurality of identifier files, each identifier file corresponding to a respective software product installed on the machine, wherein selecting the identifier file further comprises:
using a neural network comprising:
neurons in a first layer, each neuron in the first layer:
  computing a similarity score for each file in a list of input files by comparing the each file with each identifier file from the identifier file database: and
  comparing the similarity score with a respective predetermined similarity threshold: and
  outputting a candidate identifier file based on the comparison: and neurons in a second layer, a neuron in the second layer:
receiving the outputs from the neurons in the first layer, and
selecting the identifier file from the outputs from the neurons in the first layer: and
update a license of the software product on the machine with the selected identifier file.

16. The system of claim 15, wherein each neuron uses a different predetermined similarity threshold.

* * * * *